United States Patent Office 3,435,050
Patented Mar. 25, 1969

3,435,050
2,4,5-TRICHLOROIMIDAZOLE AND METHOD OF PREPARATION
Joseph L. Wasco, Midland, Mich., assignor to The Dow Chemical Company, Midland, Mich., a corporation of Delaware
No Drawing. Filed Apr. 8, 1966, Ser. No. 541,110
Int. Cl. C07d 49/36; A01n 9/22
U.S. Cl. 260—309  3 Claims

ABSTRACT OF THE DISCLOSURE

The compound 2,4,5-trichloroimidazole and its preparation from 2,4,5-tribromoimidazole by reaction with lithium chloride are disclosed. The compound is useful as a toxic agent in controlling the lone star tick.

---

The present invention is directed to 2,4,5-trichloroimidazole; this compound has the following structural formula:

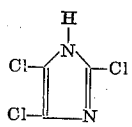

The compound is a crystalline solid melting with decomposition at 183° C. The compound is useful as a toxic agent to control various arachnid pests such as the two-spotted spider mite and lone star tick. The compound can also be employed as an insecticide for the control of such organisms as the Southern armyworm, housefly, American cockroach, confused flour beetle, and the stable fly. Moreover, the compound can be employed for the control of undesirable aquatic crustaceans such as Daphnia, particularly in bodies of water which have defined boundaries and which are managed with regard to the aquatic life they support. In addition, the compound can be employed as a herbicide.

The compound of the present invention is prepared by a process comprising two steps and employing, as starting material, 2,4,5-tribromoimidazole:

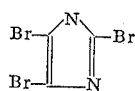

In this process, the first step consists of the reaction of the tribromoimidazole with lithium chloride, whereby the bromine atoms of the starting material are replaced with chlorine. This step may be repeated in order to assure more complete replacement of the bromine. The second step of the process comprises the hydrolysis of the mixture of materials resulting from the first step, whereby the bromine-containing imidazole materials, upon hydrolysis, admit of being easily separated to obtain the desired 2,4,5-trichloroimidazole in a relatively pure state. This second step can also be repeated to further reduce the content of brominated imidazole material.

The first step of the process is conveniently carried out in a strongly polar organic liquid as a reaction medium. Suitable such liquids include dimethylformamide and dimethyl sulfone. The amounts of 2,4,5-tribromoimidazole and lithium chloride employed are not critical, some of the desired product being obtained when the materials are employed in any amounts. However, in order that good yields of the 2,4,5-trichloroimidazole are obtained, it is essential that the lithium chloride be employed in a large excess. Generally, good results are obtained when employing a ten- to forty-fold excess of the lithium chloride. The reaction goes forward under temperatures of a wide range, such as temperatures of from 0° to 150° C.; however, temperatures of from about 75° to 125° C. are preferred.

In carrying out the reaction, the reactants are contacted intimately at temperatures within the reaction temperature range. Some of the desired product is prepared immediately upon the contact; however, in order to assure higher yields, it is generally preferred to permit the resulting reaction mixture to stand for a period of time to obtain a more thorough replacement of bromine. Thereafter, the organic liquid employed as reaction medium can be removed by evaporation under subatmospheric pressure and lithium bromide byproduct and excess lithium chloride removed by washing with water to obtain a residue comprising the desired 2,4,5-trichloroimidazole as well as mixed bromo-chloro imidazole material.

When it is desired to obtain a more thorough conversion of the starting 2,4,5-tribromoimidazole material, the product obtained from an initial lithium chloride treatment can be subjected to further such treatments. Any number of additional treatments can be carried out; however, from 2 to 10 additional treatments generally result in a 2,4,5-trichloroimidazole product of purity high enough for general application. The extent of bromine replacement during the course of repeated lithium chloride treatments can be determined by known analytical methods.

In the second step of the process, the material resulting from the first step is reacted with a dilute solution of sodium hydroxide, typically of 1.0 to 1.5 N concentration, whereby the brominated imidazole materials are selectively hydrolyzed. The reaction is generally carried out with no separate reaction medium, the water of the sodium hydroxide reactant serving this function. However, the use of a catalytic amount of copper or a copper-containing compound is advantageous to the process of the reaction. The reaction can be carried out at temperatures over a wide range, such as at temperatures of from 75 to 200° C.; however, it is preferably carried out at temperatures of from 125 to 175° C.

In carrying out the hydrolysis reaction, the reactants are contacted, preferably in a mixture containing the catalyst. Some of the desired hydrolysis takes place immediately upon the contacting of the reactants; however, the hydrolysis is more complete if the resulting reaction mixture is permitted to stand for a period of time in the reaction temperature range. Thereafter, the reaction mixture is filtered to separate the byproduct sodium salt, the filtrate acidified and the resulting acidified mixture filtered to separate the 2,4,5-trichloroimidazole product as a residue. This second step of the process can be repeated to further reduce the percentage of bromine present in the 2,4,5-trichloroimidazole product. In addition, the product compound can be recrystallized from a suitable solvent, such as one of the loweralkanols, to obtain further purification thereof.

The following example illustrates the practice of the present invention and will enable those skilled in the art to practice the same.

Example 1

2,4,5-tribromoimidazole (200 grams; 0.65 mole); lithium chloride (879 grams; 20.7 moles); and 3.5 liters of dimethylformamide were mixed together and heated, with agitation, at 100° C. for 24 hours. In the course of this heating, a substantial portion of the dimethylformamide was lost by evaporation, leaving a residue of 1807 grams of a tan powder. This powder was added to water, and the resulting aqueous slurry filtered to obtain 132 grams of a tan powder which melted at 219–20° C.; the powder was analyzed and found to contain 47.5 percent of bromine and 24.0 percent of chlorine (theoretical chlorine content of 2,4,5-trichloroimidazole, 63.05 percent).

The material thus obtained was subjected to a second and third treatment with lithium chloride, carried out under essentially the same conditions as foregoing. As a result of these operations, there was obtained a product material melting at 213–15° C.; this product material was analyzed and found to contain 25.3 percent of bromine and 40.4 percent of chlorine.

The material thus obtained was subjected to a fourth and fifth treatment with lithium chloride, yielding 112 grams of a product material melting at 212–15° C. and found, upon analysis, to contain 22.6 percent of bromine and 41.9 percent of chlorine.

Thereafter, the product material (18.4 grams; 0.092 mole, calculated for 2,4,5-trichloroimidazole), 215 milliliters of N/1. sodium hydroxide, and 1 gram of cuprous oxide were mixed in a bomb, and the bomb sealed and heated at 150° C. with agitation for 13 hours. Thereafter, heating was discontinued and the bomb opened. The reaction mixture contained therein was filtered, the filtrate acidified to a pH of 4, and the resulting acidified slurry filtered to separate the product, 9.2 grams of 2,4,5-trichloroimidazole melting with decomposition at 186° C. and found, upon analysis, to contain 1.57 percent bromine and 56.55 percent chlorine.

The 2,4,5-trichloroimidazole product thus obtained was subjected to a second sodium hydroxide treatment essentially the same as the foregoing; this treatment yielded a purified product melting with decomposition at 192° C. and found, upon analysis, to contain 0.3 percent bromine and 57.27 percent chlorine. The product was yet further purified by recrystallization from methanol, the resulting recrystallized product melting at 183° C. and having a chlorine content of 60.7 percent.

In the employment of the compound of the present invention as an arachnicide, insecticide, herbicide, and toxic agent for the control of Daphnia, the unmodified compound can be used. However, the present invention also embraces the use of the compound in a formulation. Thus, for example, the compound can be dispersed on a finely divided solid and employed therein as a dust. Also, the compound, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water or water-in-oil emulsions, or water dispersions, with or without the addition of wetting, dispersing or emulsifying agents.

In representative operations, nymphs of lone star tick (*Amblyomma americanum*) were wettied briefly with an aqueous composition containing 500 parts of 2,4,5-trichloroimidazole per million parts by weight of ultimate composition. Thereafter, adhering portions of the aqueous composition were permitted to drain off the nymphs and the nymphs then placed under favorable growing conditions. Observations made shortly thereafter showed a 100 percent kill of the nymphs.

I claim:
1. 2,4,5-trichloroimidazole.
2. Method for the preparation of 2,4,5-trichloroimidazole which comprises reacting 2,4,5-tribromoimidazole with a ten- to forty-fold excess of lithium chloride based on replaceable bromo groups, at a temperature of from 0° to 150° C., conveniently carried out in a strongly polar organic liquid such as dimethylformamide and dimethyl sulfone.
3. The method of claim 2 wherein the reaction is carried out in dimethylformamide or dimethyl sulfone as reaction medium.

References Cited

Beilsteins Handbuch der Organischen Chemie, 4th ed., vol. 23, pp. 49–50, Berlin, Springer, 1936.
Kochergin: Zh. Obshch. Khim, vol. 34, pp. 3402–7 (1964).
Kochergin: Jour. Gen. Chem., vol. 34, pp. 3444–7 (1964).
Netherlands Application 6407401 (9 pages), January 1965.
Büchel et al.: Zeit. Für Naturforschung, vol. 216, pp. 246 and 252 relied on (March 1966).

HENRY R. JILES, *Primary Examiner.*

NATALIE TROUSOF, *Assistant Examiner.*

U.S. Cl. X.R.

260—694; 424—273